Patented Mar. 24, 1936

2,035,101

UNITED STATES PATENT OFFICE 2,035,101

MANUFACTURE OF HYDROGEN PEROXIDE

Edward Cornelius Soule, Niagara Falls, N. Y., assignor to The Mathieson Alkali Works, Inc., New York, N. Y., a corporation of Virginia No Drawing. Application July 26, 1934, Serial No. 737,044

REISSUED

6 Claims. (Cl. 23—207)

My invention relates to improvements in the production of hydrogen peroxide by oxidation of hydrazo compounds.

Hydrogen peroxide can be produced by oxidation of a number of organic compounds. As applied to some of these compounds, the oxidation produces, in addition to hydrogen peroxide, an oxidized compound which can be reduced to the original compound subjected to oxidation. Hydrazo benzene is one such compound. Oxidation of hydrazo benzene produces hydrogen peroxide and azo benzene, and the azo benzene can be reduced to produce hydrazo benzene.

The availability of such compounds as intermediates in the production of hydrogen peroxide is, however, limited by the attainable chemical efficiencies of the reactions involved in successive oxidations and reductions.

For example, if hydrazo benzene, in solution in benzene, is oxidized by vigorous agitation in the presence of oxygen and of a limited amount of water, the reaction rate is so slow, even at temperatures as high as 45° C., that 7 to 8 hours may be required for oxidation of as much as 50% of the hydrazo benzene. The reaction rate is increased by making the aqueous medium present alkaline, but this alkalinity also renders unstable the hydrogen peroxide produced. Due to the long period required for oxidation of any substantial part of the hydrazo benzene, secondary reactions between hydrogen peroxide and hydrazo benzene proceed to a point such that the chemical efficiency may drop to 50% or less.

I have discovered that by using amino substituted aromatic hydrazo compounds, remarkable increases in reaction rates are realized and that high chemical efficiencies can be thus attained. For example, I have been able to produce substantially theoretical yields of hydrogen peroxide in reaction periods of 10 to 15 minutes using amino substituted aromatic hydrazo compounds under conditions such that but 40% yields of hydrogen peroxide were produced in reaction periods of 16 hours using hydrazo benzene.

In carrying out my invention, I prepared the amino substituted aromatic hydrazo compound by reduction of the corresponding azo compound under appropriate conditions, using, to effect the reduction, for example, sodium amalgam and water or zinc and an aqueous solution of sodium hydroxide. The amino substituted aromatic hydrazo compound is conveniently produced in solution in a solvent such as benzene or toluene. Losses by oxidation are avoided by carrying on the reduction in an inert atmosphere, an atmosphere of nitrogen or of hydrogen for example. Following the reduction, if a solvent immiscible with water such as benzene or toluene is used, I separate the solution of the amino substituted aromatic hydrazo compound from the aqueous material remaining after the reduction. Any entrained sodium hydroxide is eliminated from the solution, for example, by washing it with water or an acid aqueous medium, an acid salt or an acid or an acid solution of a salt, sodium sulfate for example, or by filtering the solution through, for example, an acid salt such as sodium acid sulfate or other solid absorbent for sodium hydroxide.

I carry out the oxidation of the amino substituted aromatic hydrazo compound, in accordance with my invention, in the presence of an amount of water, or of an aqueous medium rendered acid by the addition, for example, of sulfuric acid or phosphoric acid, limited to produce a hydrogen peroxide solution of the desired concentration. I add the amino substituted aromatic hydrazo compound to such an aqueous medium in amount so limited, replace the inert atmosphere by an oxidizing atmosphere, an atmosphere of oxygen or of air for example, and effect the oxidation by vigorous agitation in this atmosphere. At temperatures of 20°–25° C., reaction periods of 10 to 15 minutes are usually sufficient. Advantageously the oxidation of the amino substituted aromatic hydrazo compound is effected while maintaining the pH of the reaction medium at a value not exceeding 8. Any coloring matter present in the aqueous solution of hydrogen peroxide produced can be removed by filtering it, for example, through an absorbent such as charcoal. Hydrogen peroxide solutions containing as much as 50%–60% or more $H_2O_2$ by weight can be so produced. The azo compound produced by the oxidation, after separation from the aqueous solution of hydrogen peroxide produced, is reduced for re-use in a repetition of the process.

My invention will be further illustrated by the following examples of operations embodying the use of various amino substituted aromatic hydrazo compounds in accordance with my invention.

*Example I.*—50 parts (by weight) of 2 amino 5 azo toluene dissolved in 879 parts (by weight) of benzene was reduced by the action of 10.5 parts (by weight) of sodium, as sodium amalgam, in the presence of 100 parts (by weight) of water in an atmosphere of hydrogen. The benzene solution of the corresponding hydrazo compound was separated from the mercury and the aqueous material and, after separation, was washed free of sodium hydroxide by water from which dissolved oxygen had been displaced by hydrogen. 25 parts (by weight) of water were then added to the benzene solution and the mixture was vigorously agitated for 30 minutes in an atmosphere of oxygen at a temperature of 20°–25° C. An aqueous solution of hydrogen peroxide containing 91% of the theoretical yield was recovered by separation from the resulting benzene solution of the original azo compound.

*Example II.*—20 parts (by weight) of 4 dimethyl amino 1 azo benzene dissolved in 866 parts (by weight) of toluene was reduced by the action of sodium amalgam in the presence of water in an atmosphere of hydrogen. The toluene solution of the corresponding hydrazo compound was separated from the mercury and the aqueous material, and, after separation, was washed free of sodium hydroxide by water from which dissolved oxygen had been displaced by carbon dioxide. 10 parts (by weight) of water were then added to the toluene solution and the mixture was vigorously agitated for 10 minutes in an atmosphere of oxygen at a temperature of 20°–25° C. An aqueous solution of hydrogen peroxide containing 75% of the theoretical yield was recovered by separation from the resulting toluene solution of the original azo compound.

*Example III.*—11 parts (by weight) of amino azo xylene dissolved in 483 parts (by weight) of benzene was reduced by the action of sodium amalgam in the presence of water in an atmosphere of hydrogen. The benzene solution of the corresponding hydrazo compound was separated from the mercury in the aqueous material and, after separation, was washed free of sodium hydroxide by water from which dissolved oxygen had been displaced by carbon dioxide. 10 parts (by weight) of water were then added to the benzene solution and the mixture was vigorously agitated for 10 minutes in an atmosphere of oxygen at a temperature of 20°–25° C. An aqueous solution of hydrogen peroxide containing 72% of the theoretical yield was recovered by separation from the resulting solution of the original azo compound.

*Example IV.*—30 parts (by weight) of 4 dimethyl amino benzene 1 azo 1 naphthalene dissolved in 440 parts of benzene was reduced by the action of sodium amalgam in the presence of water in an atmosphere of hydrogen. The benzene solution of the corresponding hydrazo compound was separated from the mercury and the aqueous material and, after separation, was washed free of sodium hydroxide by water from which dissolved oxygen had been displaced by hydrogen. 25 parts (by weight) of water were then added to the benzene solution and the mixture was vigorously agitated for 10 minutes in an atmosphere of oxygen at a temperature of 20°–25° C. An aqueous solution of hydrogen peroxide containing 59% of the theoretical yield was recovered by separation from the resulting benzene solution of the original azo compound.

*Example V.*—35 parts (by weight) of 4 amino benzene 1 azo benzene dissolved in 866 parts (by weight) of toluene was reduced by the action of sodium amalgam in the presence of water in an atmosphere of hydrogen. The toluene solution of the corresponding hydrazo compound was separated from the mercury and the aqueous material and, after separation, was washed free of sodium hydroxide by water from which dissolved oxygen had been displaced by carbon dioxide. 15 parts (by weight) of water were then added to the toluene solution and the mixture was vigorously agitated for 15 minutes in an atmosphere of oxygen at a temperature of 20°–25° C. An aqueous solution of hydrogen peroxide containing 65% of the theoretical yield was recovered by separation from the resulting toluene solution of the original azo compound.

*Example VI.*—10 parts (by weight) of 2 amino 5 azo anisole dissolved in 440 parts (by weight) of benzene was reduced by the action of sodium amalgam in the presence of water in an atmosphere of hydrogen. The benzene solution of the corresponding hydrazo compound was separated from the mercury and the aqueous material and, after separation, was washed free of sodium hydroxide by water from which dissolved oxygen had been displaced by carbon dioxide. 25 parts (by weight) of water were then added to the benzene solution and the mixture was vigorously agitated for 10 minutes in an atmosphere of oxygen at a temperature of 20°–25° C. An aqueous solution of hydrogen peroxide containing 77% of the theoretical yield was recovered by separation from the resulting benzene solution of the original azo compound.

I claim:

1. In the production of hydrogen peroxide, the improvement which comprises oxidizing an amino substituted aromatic hydrazo compound in the presence of an aqueous medium.

2. In the production of hydrogen peroxide, the improvement which comprises oxidizing an amino substituted aromatic hydrazo compound in the presence of an aqueous medium having a pH not exceeding about 8.

3. In the production of hydrogen peroxide, the improvement which comprises oxidizing an amino substituted hydrazo benzene in the presence of an aqueous medium.

4. In the production of hydrogen peroxide, the improvement which comprises oxidizing an amino substituted hydrazo toluene in the presence of an aqueous medium.

5. In the production of hydrogen peroxide, the improvement which comprises oxidizing an amino substituted hydrazo xylene in the presence of an aqueous medium.

6. In the production of hydrogen peroxide, the improvement which comprises oxidizing an amino substituted hydrazo naphthalene in the presence of an aqueous medium.

EDWARD CORNELIUS SOULE.